US006701417B2

(12) United States Patent
Chaudhry et al.

(10) Patent No.: US 6,701,417 B2
(45) Date of Patent: Mar. 2, 2004

(54) METHOD AND APPARATUS FOR SUPPORTING MULTIPLE CACHE LINE INVALIDATIONS PER CYCLE

(75) Inventors: Shailender Chaudhry, San Francisco, CA (US); Marc Tremblay, Menlo Park, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 186 days.

(21) Appl. No.: 10/061,493

(22) Filed: Jan. 31, 2002

(65) Prior Publication Data

US 2002/0152359 A1 Oct. 17, 2002

Related U.S. Application Data

(60) Provisional application No. 60/283,252, filed on Apr. 11, 2001.

(51) Int. Cl.[7] .............................................. G06F 12/08
(52) U.S. Cl. ........................ 711/141; 711/122; 711/144
(58) Field of Search ................................ 711/122, 129, 711/128, 168, 144, 141

(56) References Cited

U.S. PATENT DOCUMENTS

| 5,375,220 A | | 12/1994 | Ishikawa .................... 395/425 |
| 5,530,832 A | * | 6/1996 | So et al. .................... 711/122 |
| 5,553,263 A | | 9/1996 | Kalish et al. ................ 395/454 |
| 5,890,217 A | | 3/1999 | Kabemoto et al. .......... 711/141 |
| 6,122,709 A | | 9/2000 | Wicki et al. ................. 711/118 |
| 6,151,655 A | * | 11/2000 | Jones et al. .................. 710/244 |
| 6,338,119 B1 | * | 1/2002 | Anderson et al. ........... 711/135 |
| 6,470,422 B2 | * | 10/2002 | Cai et al. .................... 711/129 |
| 2002/0010836 A1 | * | 1/2002 | Barroso et al. ............. 711/122 |

FOREIGN PATENT DOCUMENTS

EP 0 896 278 A1 8/1998

OTHER PUBLICATIONS

Hwang, T–S et al: "Delayed precise invalidation —a software cache coherence scheme" IEEE Proceedings: Computers and Digital Techniques, IEE, GB, vol. 143, No. 5, Sep. 24, 1996, pp. 337–344, XP006006205, ISSN: 1350–2387 Chapter 4.

* cited by examiner

Primary Examiner—Hiep T. Nguyen
(74) Attorney, Agent, or Firm—Park, Vaughan & Fleming LLP

(57) ABSTRACT

One embodiment of the present invention provides a multiprocessor system that supports multiple cache line invalidations within the same cycle. This multiprocessor system includes a plurality of processors and a lower-level cache that is configured to support multiple concurrent operations. It also includes a plurality of higher-level caches coupled to the plurality of processors, wherein a given higher-level cache is configured to support multiple concurrent invalidations of lines within the given higher-level cache. In one embodiment of the present invention, the lower-level cache includes a plurality of banks that can be accessed in parallel to support multiple concurrent operations. In a variation on this embodiment, each line in a given higher-level cache includes a valid bit that can be used to invalidate the line. These valid bits are contained in a memory that is organized into a plurality of banks that are associated with the plurality of banks of the lower-level cache.

26 Claims, 8 Drawing Sheets

METHOD AND APPARATUS FOR SUPPORTING MULTIPLE CACHE LINE INVALIDATIONS PER CYCLE

RELATED APPLICATION

This application hereby claims priority under 35 U.S.C. §119 to U.S. Provisional Patent Application No. 60/283,252, filed on Apr. 11, 2001, entitled "Method and Apparatus for Supporting Multiple Cache Line Invalidations Per Cycle", by inventors Shailender Chaudhry and Marc Tremblay.

BACKGROUND

1. Field of the Invention

The present invention relates the design of multiprocessor computer More specifically, the present invention relates to a method and an apparatus for performing multiple cache line invalidations at the same time.

2. Related Art

In order to achieve high rates of computational performance, computer system designers are beginning to employ multiple processors that operate in parallel to perform a single computational task. One common multiprocessor design includes a number of processors 151–154 with a number of level one (L1) caches 161–164 that share a single level two (L2) cache 180 and a memory 183 (see FIG. 1A). During operation, if a processor 151 accesses a data item that is not present in its local L1 cache 161, the system attempts to retrieve the data item from L2 cache 180. If the data item is not present in L2 cache 180, the system first retrieves the data item from memory 183 into L2 cache 180, and then from L2 cache 180 into L1 cache 161.

Note that coherence problems can arise if a copy of the same data item exists in more than one L1 cache. In this case, modifications to a first version of a data item in L1 cache 161 may cause the first version to be different than a second version of the data item in L1 cache 162.

In order to prevent coherency problems, computer systems often provide a coherency protocol that operates across bus 170. A coherency protocol typically ensures that if one copy of a data item is modified in L1 cache 161, other copies of the same data item in L1 caches 162–164, in L2 cache 180 and in memory 183 are updated or invalidated to reflect the modification.

Coherence protocols typically perform invalidations by broadcasting invalidation messages across bus 170. If such invalidations occur frequently, these invalidation messages can potentially tie up bus 170, and can thereby degrade overall system performance.

In order to remedy this problem, some designers have begun to explore the possibility of maintaining directory information within L2 cache 180. This directory information specifies which L1 caches contain copies of specific data items. This allows the system to send invalidation information to only the L1 caches that contain the data item, instead of sending a broadcast message to all L1 caches. (This type of system presumes that there exist separate communication pathways for invalidation messages to each of the L1 caches 161–164. These communication pathways are not present in the system illustrated in FIG. 1A.) Note that if more communication pathways are provided between LI caches 161–164 and L2 cache 180, it becomes possible for multiple processors to perform accesses that cause invalidations at the same time. Hence, L1 caches 161–164 may receive multiple invalidation requests at the same time.

What is needed is a method and an apparatus that facilitates performing multiple invalidations at an L1 cache at the same time.

Furthermore, note that L1 caches 161–164 are typically set-associative. Hence, when an invalidation message is received by L1 cache 161, a lookup and comparison must be performed in L1 cache 161 to determine the way location of the data item. For example, in a four-way set-associative L1 cache, a data item that belongs to a specific set can be stored in one of four possible "ways". Consequently, tags from each of the four possible ways must be retrieved and compared to determine the way location of the data item. This lookup is time-consuming and can degrade system performance.

Hence, what is needed is a method and an apparatus for invalidating an entry in an L1 cache without performing a lookup to determine the way location of the entry.

SUMMARY

One embodiment of the present invention provides a multiprocessor system that supports multiple cache line invalidations within the same cycle. This multiprocessor system includes a plurality of processors and a lower-level cache that is configured to support multiple concurrent operations. It also includes a plurality of higher-level caches coupled to the plurality of processors, wherein a given higher-level cache is configured to support multiple concurrent invalidations of lines within the given higher-level cache.

In one embodiment of the present invention, the lower-level cache includes a plurality of banks that can be accessed in parallel to support multiple concurrent operations.

In a variation on the above embodiment, the multiprocessor system includes a switch that is configured to couple the plurality of banks of the lower-level cache with the plurality of higher-level caches.

In a variation on the above embodiment, each line in a given higher-level cache includes a valid bit that can be used to invalidate the line. These valid bits are contained in a memory that is organized into a plurality of banks that are associated with the plurality of banks of the lower-level cache. Moreover, each bank containing valid bits is hardwired to an associated bank of the lower-level cache, so that the given higher-level cache can receive multiple concurrent invalidation signals from the lower-level cache.

In a variation on this embodiment, each bank containing valid bits includes a first port and a second port, wherein the first port can be used to read or write a first location in the bank while the second port is used to invalidate a second location in the bank. This can be accomplished by providing each bank containing valid bits with its own decoder that selects a wordline for the bank's second port, and by sharing a single decoder that selects a single wordline across all the banks. In a further variation, a wordline of the second port causes a memory element to be reset without coupling the memory element to a corresponding bitline.

In one embodiment of the present invention, a given invalidation signal received by a given higher-level cache includes, a set location of a line to be invalidated in the given higher-level cache, and a way location of the line to be invalidated in the given higher-level cache.

In one embodiment of the present invention, the multiprocessor system is located on a single semiconductor chip.

In one embodiment of the present invention, the lower-level cache is an L2 cache, and each of the plurality of higher-level caches is an L1 cache.

In one embodiment of the present invention, the plurality of higher-level caches are organized as write-through caches, so that updates to the plurality of higher-level caches are immediately written through to the lower-level cache.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Multiprocessor System

Figure 1A:
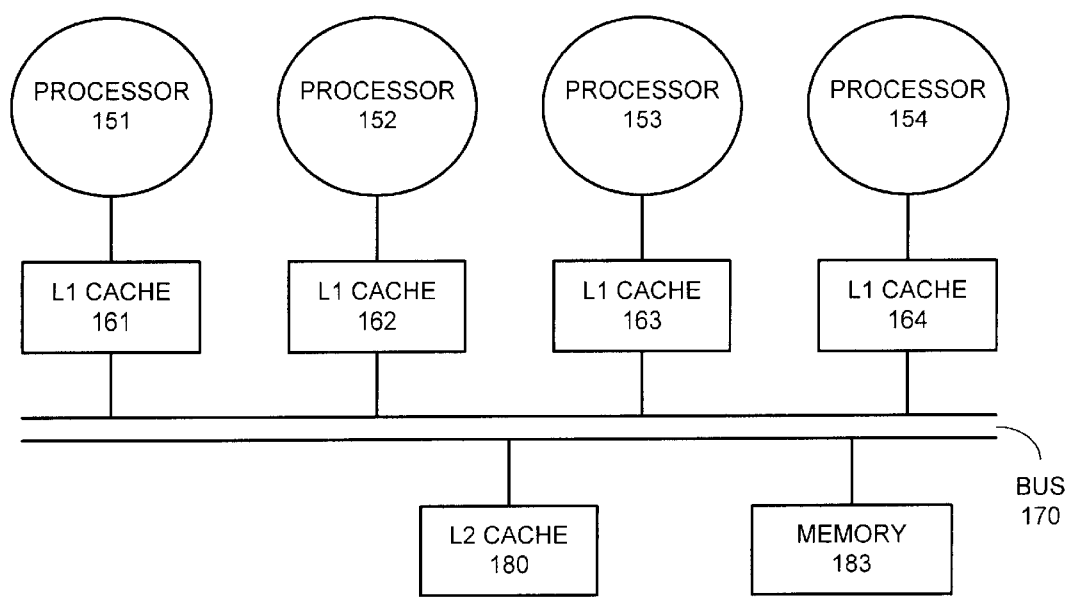
FIG. 1A illustrates a multiprocessor system.
Figure 1B:
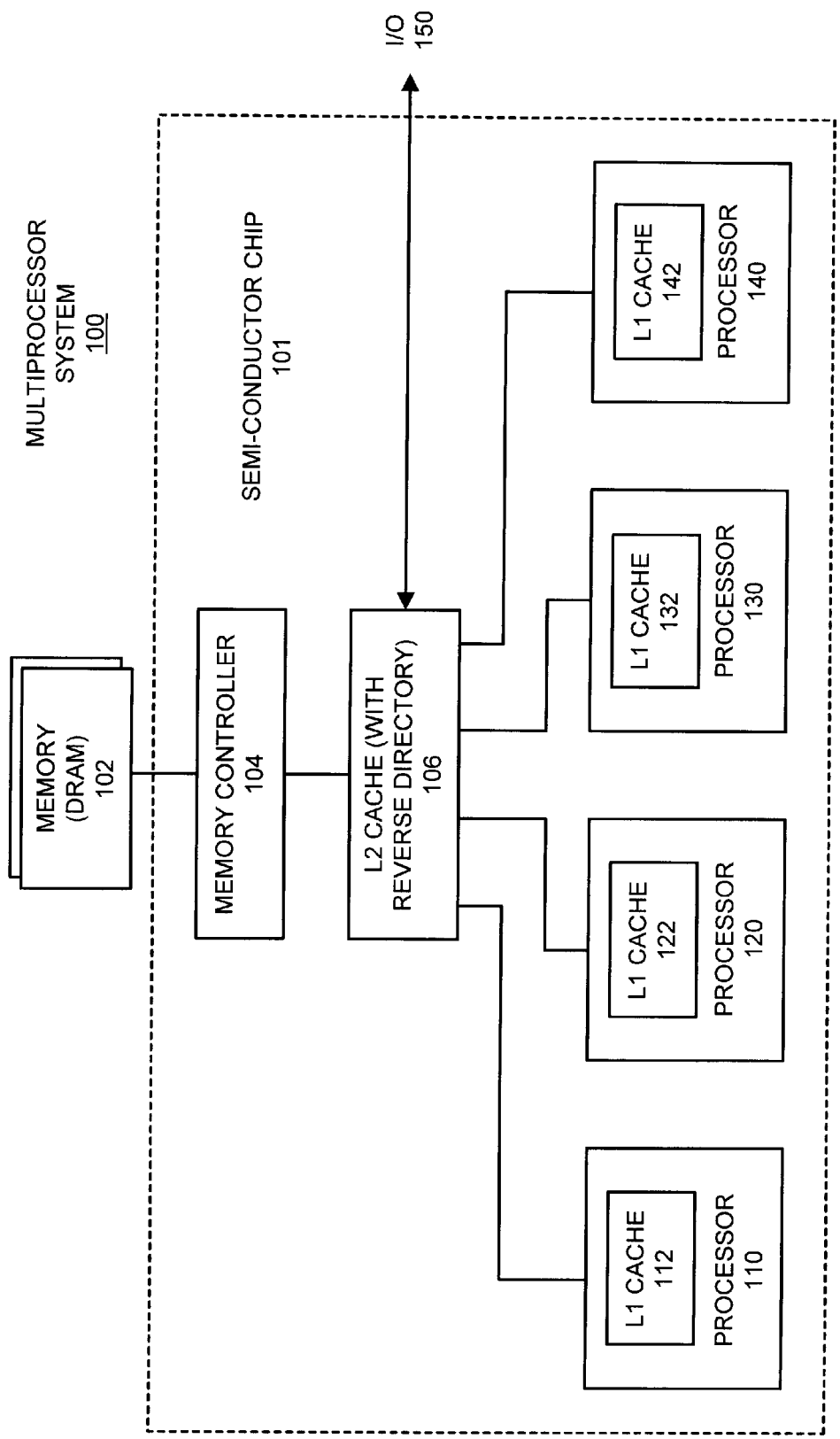
FIG. 1B illustrates a multiprocessor system including an L2 cache with a reverse directory in accordance with an embodiment of the present invention.

FIG. 1B illustrates a multiprocessor system 100 with a reverse directory in accordance with an embodiment of the present invention. Note that most of multiprocessor system 100 is located within a single semiconductor chip 101. More specifically, semiconductor chip 101 includes a number of processors 110, 120, 130 and 140, which contain level one (L1) caches 112, 122, 132 and 142, respectively. Note that the L1 caches 112, 122, 132 and 142 may be separate instruction and data caches, or alternatively, unified instruction/data caches. L1 caches 112, 122, 132 and 142 are coupled to level two (L2) cache 106, which includes a reverse directory 302 (described in more detail with reference to FIGS. 3–6 below). L2 cache 106 is coupled to off-chip memory 102 through memory controller 104.

In one embodiment of the present invention, L1 caches 112, 122, 132 and 142 are write-through caches, which means that all updates to L1 caches 112, 122, 132 and 142 are automatically propagated to L2 cache 106. This simplifies the coherence protocol, because if processor 110 requires a data item that is present in L1 cache 112, processor 110 can receive the data from L2 cache 106 without having to wait for L1 cache 112 to source the data. Moreover, no forwarding network is needed to allow L1 cache 112 to source the data. Note that in one embodiment of the present invention, L2 cache 106 is an "inclusive cache", which means that all items in L1 caches 112, 122, 132 and 142 are included in L2 cache 106.

L2 Cache with Multiple Banks

Figure 2:
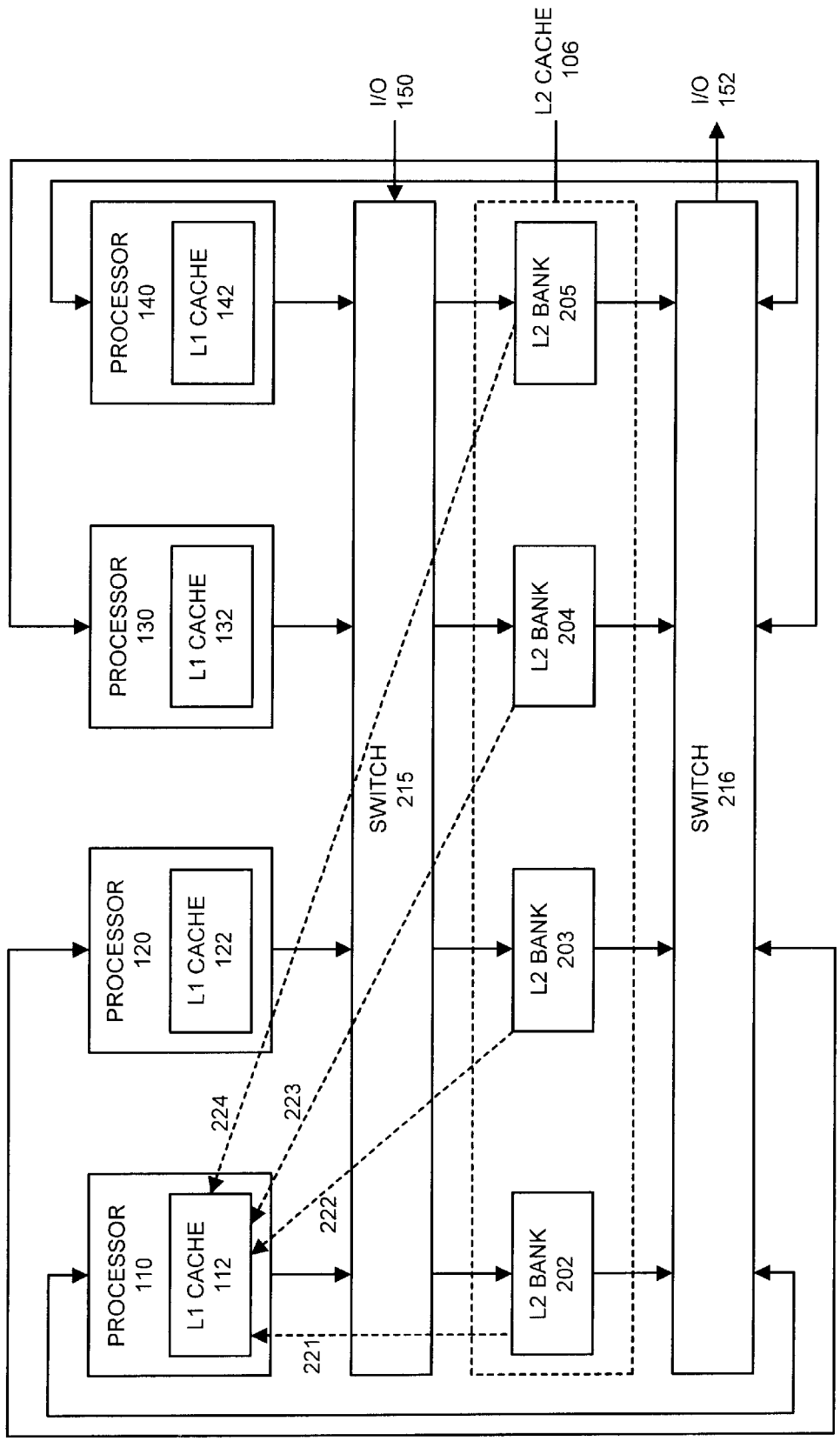
FIG. 2 illustrates an L2 cache with multiple banks within a multiprocessor system in accordance with an embodiment of the present invention.

FIG. 2 illustrates an L2 cache 106 with multiple banks in accordance with an embodiment of the present invention. In this embodiment, L2 cache 106 is implemented with four banks 202–205, which can be accessed in parallel by processors 110, 120, 130 and 140 through switches 215 and 218. Switch 215 handles communications that feed from processors 110, 120, 130 and 140 into L2 banks 202–205, while switch 216 handles communications in the reverse direction from L2 banks 202–205 to processors 110, 120, 130 and 140.

Note that only two bits of the address are required to determine which of the four banks 202–205 a memory request is directed to. Also note that switch 215 additionally includes an I/O port 150 for receiving communications from I/O devices, and switch 216 includes an I/O port 152 for sending communications to I/O devices. Furthermore, in one embodiment of the present invention, each of these banks 202–205 includes a reverse directory, which is described in more detail below with reference to FIG. 5.

Note that by using this "banked" architecture, it is possible to concurrently connect each L1 cache to its own bank of L2 cache, thereby increasing the bandwidth of L2 cache 106.

However, concurrent accesses to L2 cache 106 can potentially cause multiple invalidations of lines within L1 caches 112, 122, 132 and 142. In order to support these invalidations, each L1 cache has a separate pathway to receive an invalidation signal from each of the banks 202–205 of L2 cache 106.

As illustrated in FIG. 2, L1 cache 112 receives: an invalidation signal 221 from L2 bank 202, an invalidation signal 222 from L2 bank 203, an invalidation signal 223 from L2 bank 204, and an invalidation signal 224 from L2 bank 205. Each of the other L1 caches 122, 132 and 142 receive similar invalidation signals from L2 banks 202–205. However, these additional invalidation signals are not illustrated in FIG. 1 for purposes of clarity.

Reverse Directory

Figure 3:
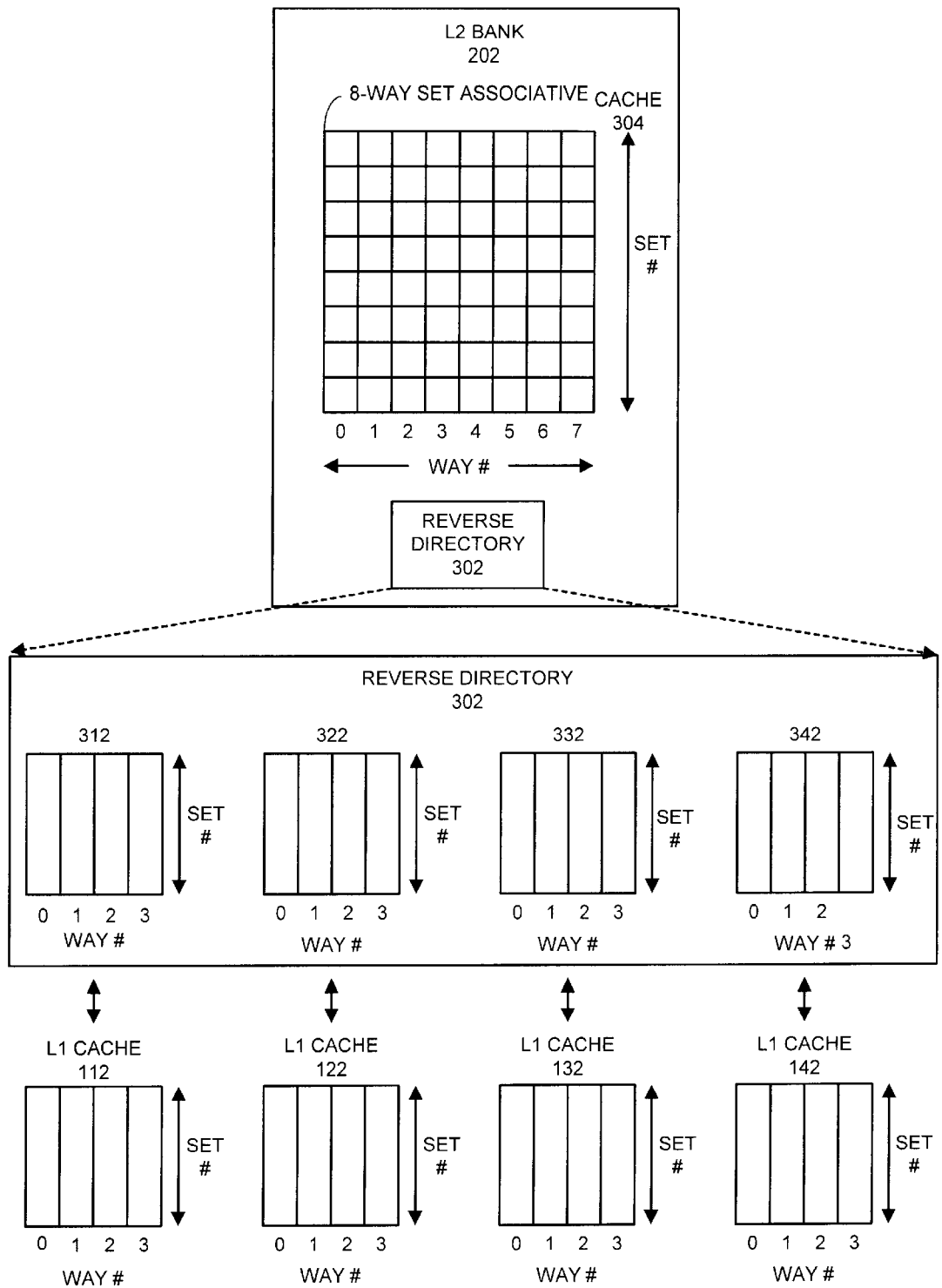
FIG. 3 illustrates a reverse directory in accordance with an embodiment of the present invention.

FIG. 3 illustrates L2 bank 202 along with an associated reverse directory 302 in accordance with an embodiment of the present invention. L2 bank 202 contains an eight-way set associative cache 304 for storing instructions and data. A portion of the address is used to determine a set (row) within cache 304. Within a given set, eight different entries can be stored in each of eight different "way locations," which are represented by the eight columns in cache 304.

Reverse directory 302 includes a separate block for each L1 cache. More specifically, block 312 is associated with L1 cache 112, block 322 is associated with L1 cache 122, block 332 is associated with L1 cache 132, and block 342 is associated with L1 cache 142.

Note that each of these blocks 312, 322, 332 and 342 includes an entry for each line in the associated L1 caches 112, 122, 132 and 142. Moreover, since L1 cache 112 is organized as a four-way set associative cache, the associated block 312 within reverse directory 302 is also organized in the same fashion. However, entries within L1 cache 112 contain data and instructions, whereas entries within the associated block 312 contain indexing information specifying a location of the line within cache 304.

Invalidation Signal

Figure 4:
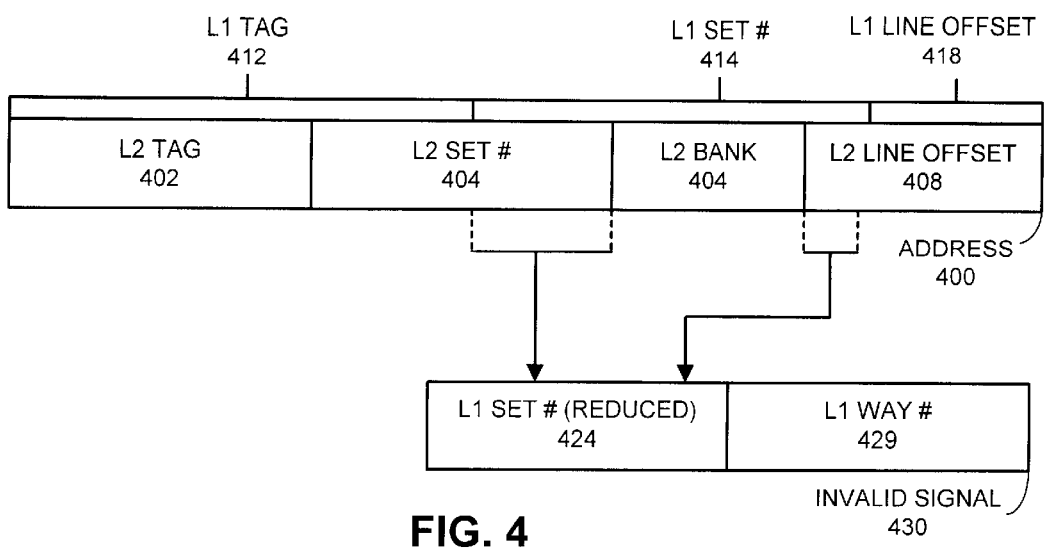
FIG. 4 illustrates an address and an associated invalidation signal in accordance with an embodiment of the present invention.

FIG. 4 illustrates an address 400 and an associated invalidation signal 430 in accordance with an embodiment of the present invention.

The top portion of FIG. 4 illustrates the address 400, which specifies the location of a data item (or instruction)

within memory. L1 cache 112 divides this address into L1 tag 412, L1 set number 414, and L1 line offset 418. L1 set number 414 is used to look up a specific set of the four-way set-associative LI cache 112. L1 tag 412 is stored in L1 cache 112, and is used to perform comparisons for purposes of implementing the four-way set-associative memory for each set. L1 line offset 418 determines a location of a specific data item within the line in L1 cache 112.

L2 cache 106 divides address 400 into L2 tag 402, L2 set number 404, L2 bank number 406 and L2 line offset 408. L2 bank number 406 determines a specific bank from the four banks 202–205 of L2 cache 106. L2 set number 404 is used to look up a specific set of the eight-way set-associative bank of L2 cache 106. L2 tag 402 is stored in a specific bank of L2 cache 106, and is used to perform comparisons for purposes of implementing the eight-way set-associative memory for each set. L2 line offset 408 determines a location of a specific data item within the line in L2 cache 106.

Figure 5:
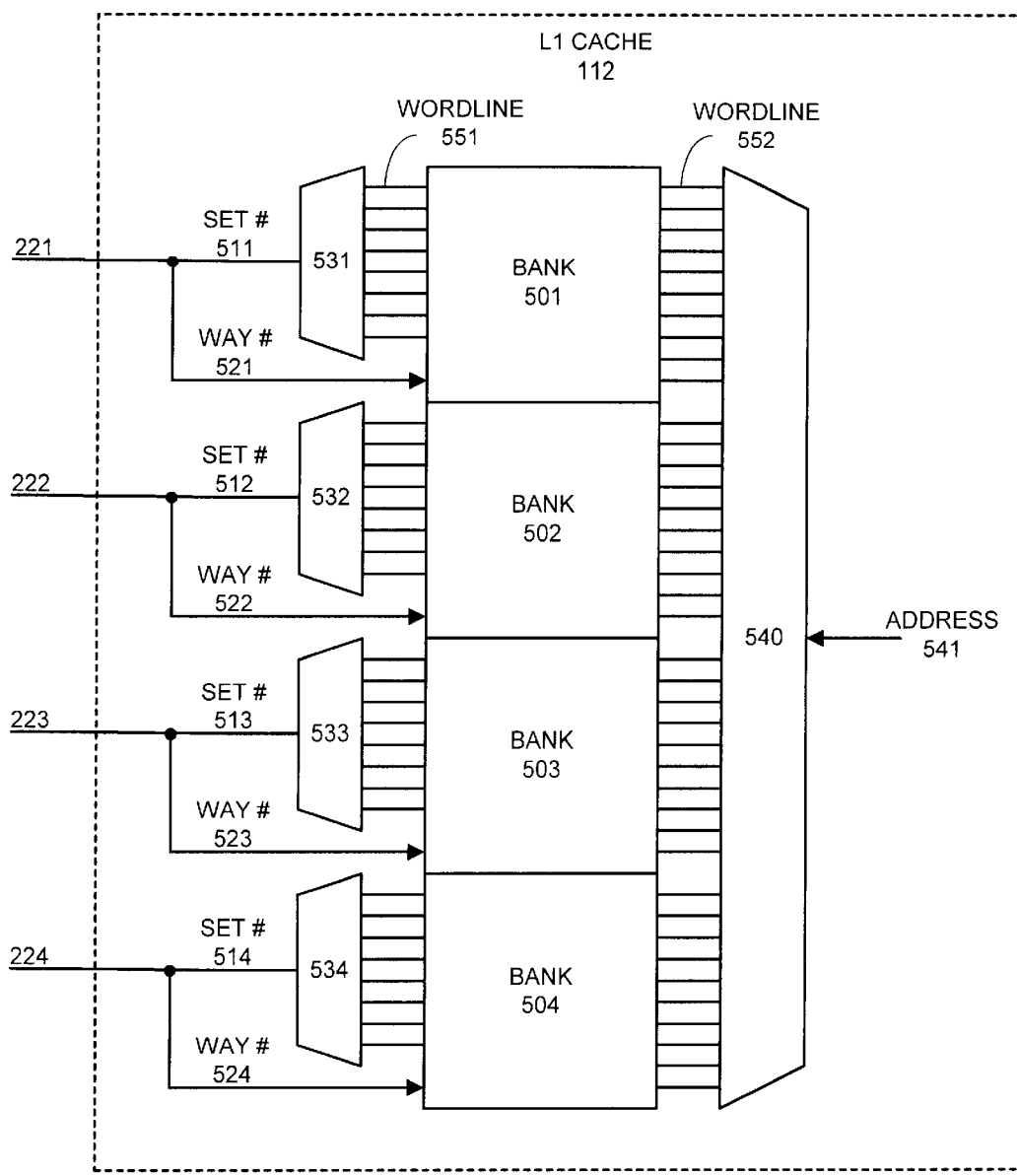
FIG. 5 illustrates the structure of a memory that includes multiple ports for invalidations in accordance with an embodiment of the present invention.

The corresponding invalidation signal 430 for address 400 contains reduced L1 set number 424 and L1 way number 429. Reduced L1 set number 424 includes L1 set number 414 without the bits for L2 bank number 406. The bits for L2 bank number can be removed because, as can be seen in FIG. 5, each invalidation signal is hardwired to a corresponding bank of L2 cache 106, so the L2 bank number 406 is not needed. L1 way number 429 contains a two-bit index which specifies a way (column) location of the line, out of the four possible way locations for the line, in L1 cache 112.

Memory that Supports Multiple Concurrent Invalidations

FIG. 5 illustrates the structure of a memory that stores valid bits for lines within L1 cache 112 in accordance with an embodiment of the present invention. This memory includes multiple banks 501–504, and multiple ports for receiving invalidation signals 221–224, wherein each invalidation signal is coupled to its own bank of memory. More specifically, invalidation signal 221 is coupled to bank 501, invalidation signal 222 is coupled to bank 502, invalidation signal 223 is coupled to bank 503 and invalidation signal 224 is coupled to bank 504

Also note that each of these banks is divided into four "ways" to reflect the four-way associative structure of L1 cache 112. Hence, the way number 429 for each of the invalidation signals 221–224 is separated from the set number 424, and the set number 424 feeds through a decoder to select a wordline. Note that each bank entry has a separate valid bit for each way. Also note that L1 way number 429 enables the specific valid bit associated with an operation.

For example, invalidation signal 211 is divided into set number 511 and way number 521. Way number 521 is used to select a column of bank 501, while set number 511 feeds through decoder 531 to activate a wordline for bank 501.

Note that the memory also includes at least one additional port in the right-hand side for performing read or write operations at the same time invalidations are taking place from the left-hand side. This port receives an address 541, which feeds through a decoder 541 that selects a single wordline across all of the banks 501–504 of the memory.

Memory Cell Structure

Figure 6:
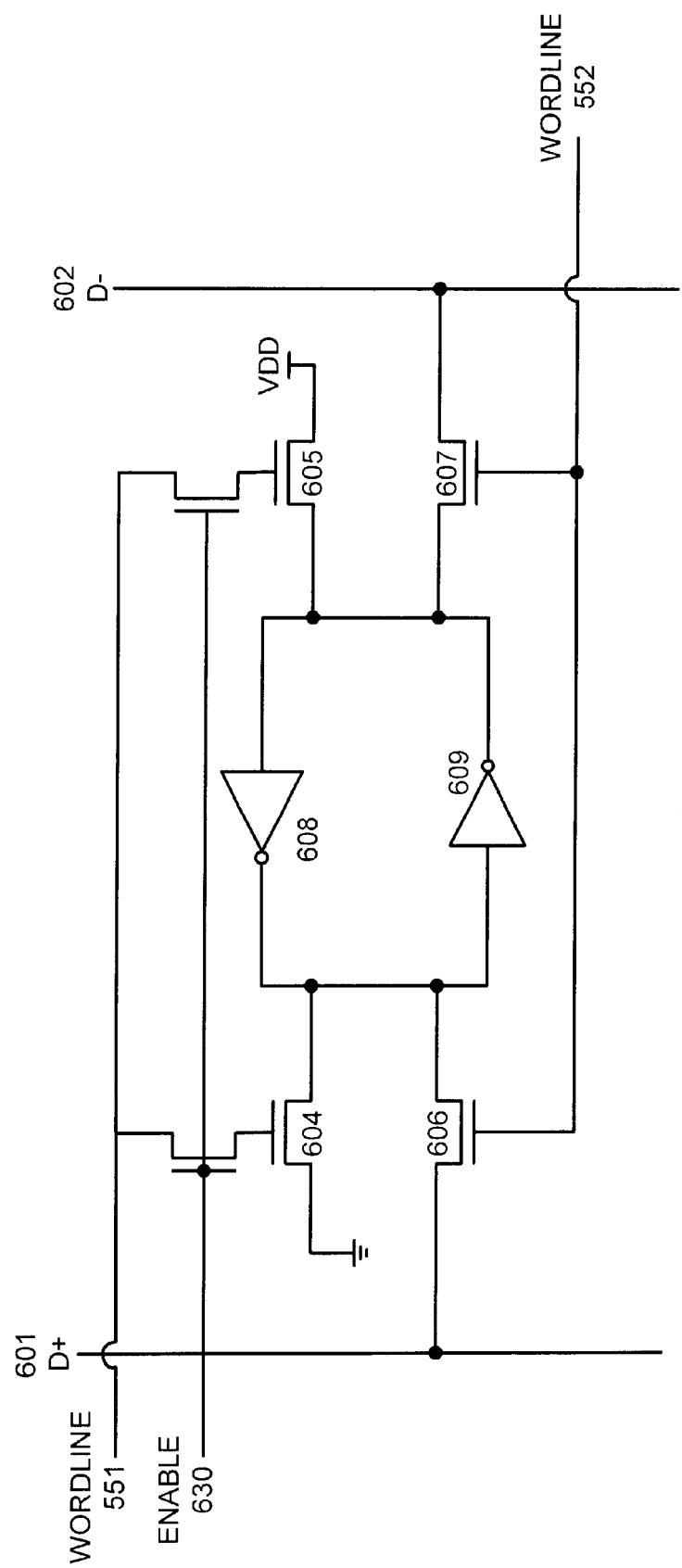
FIG. 6 illustrates the structure of a single memory cell within the memory illustrated in FIG. 5 in accordance with an embodiment of the present invention.

FIG. 6 illustrates the structure of a single memory cell within the memory illustrated in FIG. 5 in accordance with an embodiment of the present invention. This memory cell receives a wordline 551 from the invalidation port and a wordline 552 from the read/write port. Note that this memory cell may potentially be coupled to other ports and associated wordlines.

Activating wordline 551 causes the memory cell to be coupled to ground on the left-hand-side and to VDD on the right-hand-side. Note that no bitlines are required for an invalidation operation because an invalidation operation always sets the memory element to a logical zero value. Also note that enable signal 630 which is determined from L1 way number 429 enables operation of wordline 551.

In contrast, activating wordline 552 causes the memory element to be coupled to differential bitlines D+601 and D−602, which are used to read from or write to the memory element.

Process of Performing Concurrent Invalidations

Figure 7:
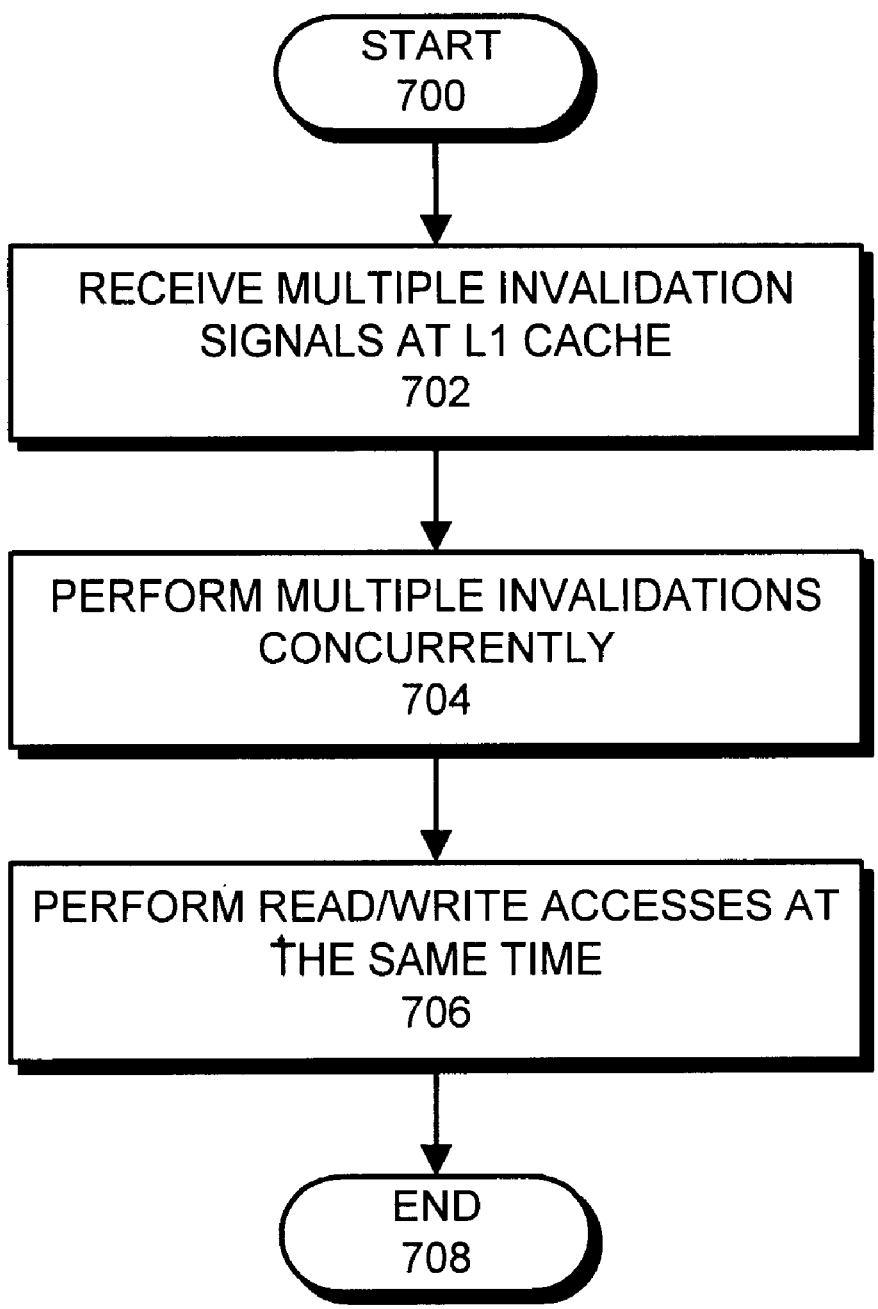
FIG. 7 is a flow chart illustrating the process of concurrently invalidating multiple cache lines in accordance with an embodiment of the present invention.

FIG. 7 is a flow chart illustrating the process of concurrently invalidating multiple cache lines in accordance with an embodiment of the present invention. The process starts when multiple invalidation signals 221–224 are received at L1 cache 112 (step 702). In response to these multiple invalidation signals 221–224, the system performs concurrent invalidations on the multiple banks 501–504 of LI cache 112 illustrated in FIG. 5 (step 704). Note that read/write accesses can be performed on the memory through the separate read/write port at the same time these concurrent invalidations are taking place (step 706).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A multiprocessor system that supports multiple cache line invalidations within the same cycle, comprising:

a plurality of processors;

a lower-level cache that is configured to support multiple concurrent operations;

a plurality of higher-level caches coupled to the plurality of processors, wherein the plurality of higher-level caches are configured to perform memory accesses through the lower level-cache; and wherein each of the plurality of higher-level caches is configured to support multiple concurrent invalidations of lines within the higher-level cache.

2. The multiprocessor system of claim 1, wherein the lower-level cache includes a plurality of banks that can be accessed in parallel to support multiple concurrent operations.

3. The multiprocessor system of claim 2, further comprising a switch that is configured to couple the plurality of banks of the lower-level cache with the plurality of higher-level caches.

4. The multiprocessor system of claim 2, wherein each line in a given higher-level cache includes a valid bit that can be used to invalidate the line;

wherein the valid bits for the given higher-level cache are contained in a memory that is organized into a plurality of banks that are associated with the plurality of banks of the lower-level cache; and wherein each bank containing valid bits is hardwired to an associated bank of the lower-level cache, so that the given higher-level cache can receive multiple concurrent invalidation signals from the lower-level cache.

5. The multiprocessor system of claim 4, wherein each bank containing valid bits includes a first port and a second port, wherein the first port can be used to read or write a first location in the bank while the second port is used to invalidate a second location in the bank.

6. The multiprocessor system of claim 5, wherein a wordline of the second port causes a memory element to be reset without coupling the memory element to a corresponding bitline.

7. The multiprocessor system of claim 5,
wherein each bank containing valid bits includes its own decoder that selects a wordline for the bank's second port; and
wherein the plurality of banks share a single decoder that selects a single wordline across the first ports of the plurality of banks.

8. The multiprocessor system of claim 1, wherein a given invalidation signal received by a given higher-level cache includes:
a set location of a line to be invalidated in the given higher-level cache; and
a way location of the line to be invalidated in the given higher-level cache.

9. The multiprocessor system of claim 1, wherein the multiprocessor system is located on a single semiconductor chip.

10. The multiprocessor system of claim 1,
wherein the lower-level cache is an L2 cache; and
wherein each of the plurality of higher-level caches is an L1 cache.

11. The multiprocessor system of claim 1, wherein the plurality of higher-level caches are organized as write-through caches, so that updates to the plurality of higher-level caches are immediately written through to the lower-level cache.

12. A cache that supports multiple cache line invalidations within the same cycle, comprising:
a plurality of cache lines for storing code and/or data;
wherein each cache line includes a valid bit that can be used to invalidate the cache line;
a memory for storing valid bits for the plurality of cache lines that is organized into a plurality of banks; and
wherein each bank receives its own invalidation signal so that multiple invalidations can take place in parallel.

13. The cache of claim 12, wherein each bank includes a first port and a second port, wherein the first port can be used to read or write to a first location in the bank while the second port is used to invalidate a second location in the bank.

14. The cache of claim 13, wherein a wordline of the second port causes a memory element to be reset without coupling the memory element to a bitline.

15. The cache of claim 12, wherein the cache is an L1 cache that receives invalidation signal from an L2 cache.

16. The cache of claim 15,
wherein the L2 cache includes a plurality of L2 banks that can be accessed in parallel to support multiple concurrent operations; and
wherein each bank containing valid bits is hardwired to an associated L2 bank, so that the L1 cache can receive multiple concurrent invalidation signals from the L2 cache.

17. The cache of claim 12,
wherein each bank containing valid bits includes its own decoder that selects a wordline for the bank's second port; and
wherein the plurality of banks share a single decoder that selects a single wordline across the first ports of the plurality of banks.

18. The cache of claim 12, wherein a given invalidation signal received by the cache includes:
a set location of a cache line to be invalidated in the cache; and
a way location of the cache line to be invalidated in the cache.

19. A method for performing multiple cache line invalidations within the same cycle, wherein the method operates in a system that includes a plurality of processors, a lower-level cache, and a plurality of higher-level caches coupled to the plurality of processors, wherein the plurality of higher-level caches are configured to perform memory accesses through the lower level-cache, the method comprising:
receiving multiple invalidation signals at a higher-level cache from the lower-level cache, wherein the multiple invalidation signals are caused by multiple concurrent operations on the lower-level cache; and
performing multiple invalidations concurrently to invalidate multiple entries in the higher-level cache at the same time.

20. The method of claim 19, wherein the lower-level cache includes a plurality of banks that can be accessed in parallel to support the multiple concurrent operations.

21. The method of claim 20,
wherein each line in the higher-level cache includes a valid bit that can be used to invalidate the line;
wherein the valid bits for the higher-level cache are contained in a memory that is organized into a plurality of banks that are associated with the plurality of banks of the lower-level cache; and
wherein each bank containing valid bits is hardwired to an associated bank of the lower-level cache, so that the higher-level cache can receive multiple concurrent invalidation signals from the lower-level cache.

22. The method of claim 21, further comprising performing read or write operations on the higher-level cache at the same time that multiple invalidation operations are being performed on the higher-level cache.

23. The method of claim 19, wherein performing an invalidation involves asserting a wordline of a memory element that resets the memory element without coupling the memory element to a bitline.

24. The method of claim 19, wherein receiving an invalidation signal involves receiving:
a set location of a line to be invalidated in the higher-level cache; and
a way location of the line to be invalidated in the higher-level cache.

25. The method of claim 19, wherein the lower-level cache is an L2 cache; and
wherein each of the plurality of higher-level caches is an L1 cache.

26. The method of claim 19, wherein the plurality of higher-level caches are organized as write-through caches, so that updates to the plurality of higher-level caches are immediately written through to the lower-level cache.

* * * * *